United States Patent
Hida

[19]

[11] Patent Number: 6,124,921
[45] Date of Patent: Sep. 26, 2000

[54] METHOD AND APPARATUS FOR JUDGING AN ERROR IN READING DATA RECORDED IN A PHOTOGRAPHIC FILM

[75] Inventor: Keiji Hida, Hannan, Japan

[73] Assignee: Noritsu Koki Co., Ltd., Wakayama, Japan

[21] Appl. No.: 09/114,257

[22] Filed: Jul. 13, 1998

[30] Foreign Application Priority Data

Jul. 11, 1997 [JP] Japan .................................. 9-186385

[51] Int. Cl.[7] ........................ G03B 27/52; G03B 17/24
[52] U.S. Cl. ........................................... 355/40; 396/119
[58] Field of Search .................................. 396/319, 315, 396/311, 310, 320; 355/40, 41, 27; 360/3, 53; 714/704, 763, 805, 819

[56] References Cited

U.S. PATENT DOCUMENTS

| | | | |
|---|---|---|---|
| 5,214,468 | 5/1993 | Seto | 355/41 |
| 5,416,546 | 5/1995 | Izukawa | 396/319 |
| 5,727,240 | 3/1998 | Mizumoto et al. | 396/319 |
| 5,758,216 | 5/1998 | Arnold | 396/311 |
| 5,847,811 | 12/1998 | Tsujimoto et al. | 355/40 |

FOREIGN PATENT DOCUMENTS

| | | |
|---|---|---|
| 0675395 | 10/1995 | European Pat. Off. . |
| 19622177 | 12/1996 | Germany . |
| 9004212 | 4/1990 | WIPO . |

*Primary Examiner*—Eddie C. Lee
*Assistant Examiner*—Peter B. Kim
*Attorney, Agent, or Firm*—Smith Patent Office

[57] ABSTRACT

A method for judging an occurrence of an error when reading magnetic data obtained by scanning magnetic recording portions provided in conformity with the respective frames of a photographic film F by a magnetic data reader. The method comprises detecting whether or not a read state of the magnetic data has changed between successive frames, counting the number of changes in the read state and judging whether or not a data read error has occurred by comparing a count value with a judgment reference number.

13 Claims, 8 Drawing Sheets

METHOD AND APPARATUS FOR JUDGING AN ERROR IN READING DATA RECORDED IN A PHOTOGRAPHIC FILM

BACKGROUND OF THE INVENTION

1. Field of the Invention

The present invention relates to a method for judging a read error and an apparatus for judging whether an error has occurred when reading data recorded in recording portions provided in conformity with the respective frames of a photographic film.

2. Description of the Related Art

In recent years, advanced photosystems having a variety of standards have been put into practical use. A photographic film used in conjunction with this advanced photosystem is formed with magnetic recording portions corresponding to exposure areas of the respective frames so that information concerning the photographing such as a date of photographing and an exposure value (hereinafter, "photograph information") can be recorded as magnetic data by a recording means in a camera. The magnetic data recorded in the magnetic recording portions are read, for example, by a reading means provided in a photo-printing apparatus. Based on the read data, a character image of, e.g. the date of photographing is printed on a photographic paper and the printing is performed with a proper exposure condition set.

Some of the above photographic films are provided, in addition to the magnetic recording portions in which the photograph information is recorded, with magnetic recording portions in which information concerning printing (hereinafter, "print information") such as the number of prints to be made and a date of printing is so recorded by, e.g. a photographic film processing apparatus other than a camera such as a photo-printing apparatus in conformity with the respective frames. The magnetic data recorded in the latter magnetic recording portions are read by a reading means provided in, e.g. the photo-printing apparatus and a specified processing is performed based on the data read.

With the photographic film used in conjunction with the advanced photosystem, exposure may be freely stopped and started, i.e. it may be stopped after an intermediate frame or started from an intermediate frame. Accordingly, in the case the photograph information is recorded for the exposed frames without fail, the magnetic data may be recorded only up to an intermediate frame or only from an intermediate frame in the photographic film taken out of the camera after the photographing operation.

In such a case, if there is a frame whose magnetic data could not be read when the magnetic recording portions are subjected to relative scanning by the reading means of the photo-printing apparatus or the like, whether a read error has occurred or the magnetic data is not recorded cannot be judged. Accordingly, every time there is a frame whose magnetic data, including the photograph information and the print information, could not be read from the respective magnetic recording portions, necessary processing steps are performed later regardless of whether or not a read error has actually occurred.

On the other hand, it is also possible not to record the photograph information for the respective exposed frames. In such a case, the magnetic data is recorded in none of the magnetic recording portions for storing the photographing information. In this case as well, necessary processing steps are performed later assuming that an error has occurred when reading the magnetic data.

Thus, even if the magnetic data is not recorded and no read error has actually occurred, it is necessary to reread the data because of apprehension of a possible read error. This reduces operability during the printing operation. Further, although the magnetic data may be obtained by rereading the data if the read error has actually occurred, an occurrence of the read error is judged again if the magnetic data is not recorded. This may lead to apprehension that the apparatus may be defective.

In view of the above problems, an object of the present invention is to provide a method and an apparatus for accurately judging whether or not an error has occurred when reading data recorded in recording portions provided in conformity with the respective frames of a photographic film.

SUMMARY OF THE INVENTION

In order to accomplish the above objects, the invention is directed to a method for judging an occurrence of an error in reading data recorded in recording portions provided in conformity with the respective frames of a photographic film, comprising the steps of:

detecting whether or not a read state has changed from on to off or from off to on between successive frames;

counting the number of changes in the read states; and judging an occurrence of an error reading the data by comparing a count value of the number of changes in the read states with a judgment reference value.

According to the above method, a change in the read state is detected when the read state has changed from on to off or from off to on between the successive frames. The number of the changes in the read state is counted and whether or not the data read error has occurred is judged by comparing the count value with the judgment reference value.

Preferably, the data read error is judged not to have occurred when the count value is one or smaller.

According to this method, the data read error is judged not to have occurred when the count value is 0 or 1. In other words, the case where the count value is 0 or 1 is assumed to be when the data are recorded in the recording portions for all frames or for none of the frames, or from the first frame to an intermediate frame or from an intermediate frame to the last frame. In these cases, the data read error is judged not to have occurred.

Further preferably, the data read error is judged to have occurred when the count value is two or larger.

According to this method, the data read error is judged to have occurred when the count value is 2 or larger. In other words, the case where the count value is 2 or larger is assumed not to be when the data are recorded in the recording portions for all frames or for none of the frames or from the first frame to an intermediate frame or from an intermediate frame to the last frame. In these cases, the data read error is judged to have occurred.

Preferably, each recording portion comprises a first recording portion in which the data is recorded by a recording means provided in a camera and a second recording portion in which the data is recorded by a recording means provided outside the camera and only the error in reading the data from the first recording portion is judged.

There is a certain degree of regularity in the changes in the read state of the data for the first recording portions in which the data are recorded by the recording means of the camera. However, there is often no such regularity for the second recording portions in which the data are recorded by the recording means provided outside the camera. Thus, only the error in reading the data from the first recording portions is judged.

The invention is also directed to an apparatus for judging an occurrence of an error in reading data recorded in recording portions provided in conformity with the respective frames of a photographic film, comprising:

a reading means for reading data recorded in the recording portions frame by frame;

a detector means for detecting whether or not a read state has changed from on to off or from off to on between successive frames;

a counter means for counting the number of changes in the read states; and a judging means for judging an occurrence of an error reading the data by comparing the count value of the number of changes in the read states with a judgment reference value.

With the above construction, when the respective frames are successively subjected to relative scanning by the reading means, the change in the read state is detected when the read state has changed from on to off or from off to on between the successive frames. The number of changes in the read state is counted by the counter means and whether or not the data read error has occurred is judged by comparing the count value obtained by the counter means with the judgment reference value.

Preferably, there is further provided a notifying means for notifying information concerning the judgment when the read error is judged to have occurred.

With this construction, the information concerning the judgment is notified when the read error is judged to have occurred.

Preferably, there is further provided an instructing means for instructing the rereading of the data when the read error is judged to have occurred.

With this construction, the rereading of the data is instructed and performed if necessary when the read error is judged to have occurred.

BRIEF DESCRIPTION OF THE DRAWINGS

FIGS. 7A, 7B, 7C and 7D are charts showing read states of magnetic data in the magnetic recording portions of the photographic film.

FIGS. 8A and 8B are charts showing read states of magnetic data in magnetic recording portions of the photographic film.

DETAILED DESCRIPTION OF THE PREFERRED EMBODIMENTS

Figure 1:
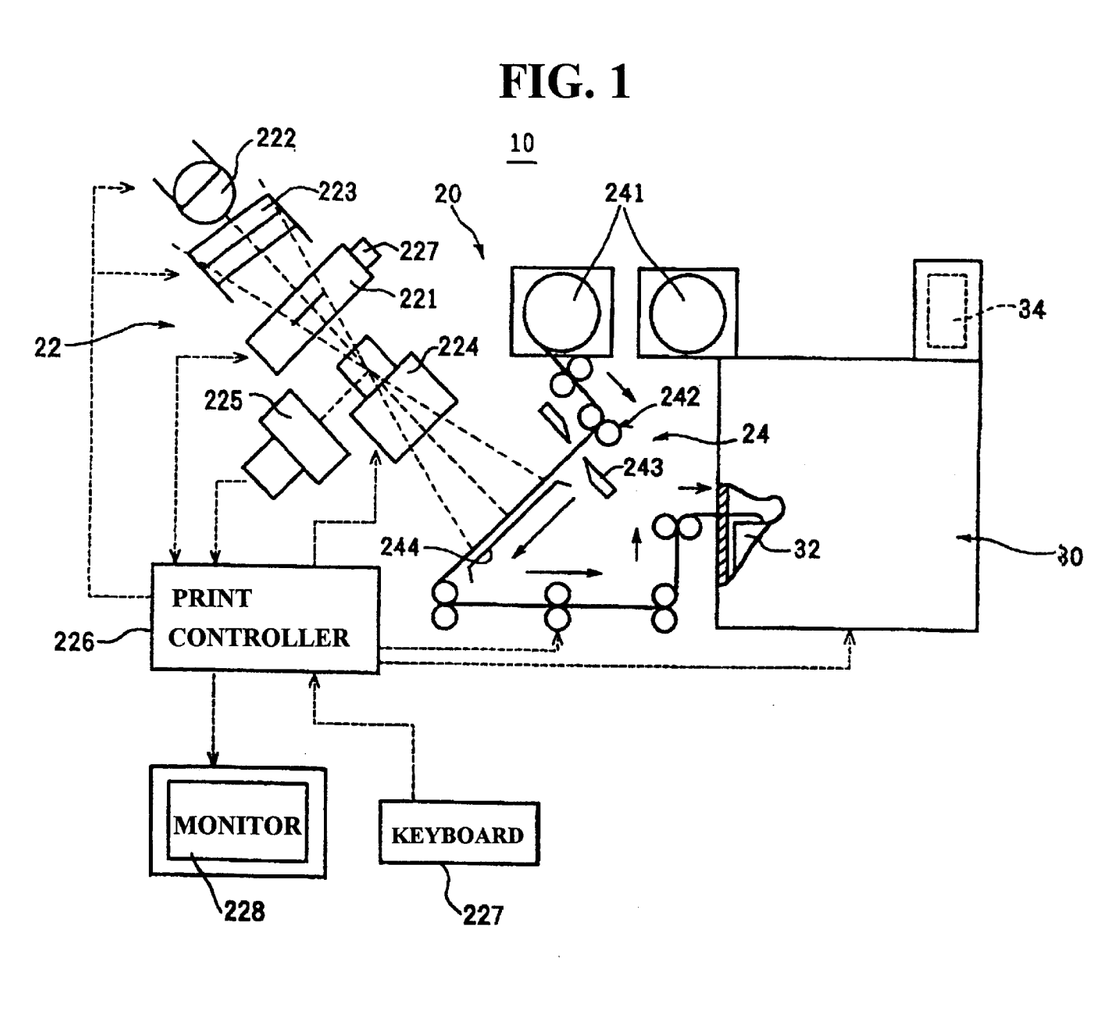
FIG. 1 is a schematic diagram of a photo-printing apparatus provided with a judging apparatus implementing an inventive method for judging whether or not an error has occurred when reading data recorded in a photographic film.

FIG. 1 is a schematic diagram of a photo-printing apparatus provided with a judging apparatus implementing an inventive method for judging whether or not an error has occurred when reading data recorded in a photographic film. In FIG. 1, the photo-printing apparatus 10 prints images recorded in a film (hereinafter, film images) by projecting them on photographic paper. The photo-printing apparatus comprises a print processing assembly 20 and a developing assembly 30.

The print processing assembly 20 is provided with a film image projector 22 and a printer 24. The film image projector 22 includes a feeding unit 221 for successively conveying the respective frames of a negative film to an exposure position; a light source 222 such as a halogen lamp provided above the negative film set in the feeding unit 221; a filter unit 223 which adjusts light irradiated from the light source 222 and is provided between the feeding unit 221 and the light source 222; an optical lens 224 for focusing the film image on a photographic paper; a negative scanning unit 225 for reading images in the negative film; and a print controller 226 for controlling the operation of the film image projector 22. The feeding unit 221 is provided with a reading unit 227 for relatively scanning magnetic recording portions of the negative film by a reading means to read magnetic data recorded in the magnetic recording portions. Further, the print controller 226 simultaneously controls the printer 24 and the developing assembly 30.

A keyboard 227 is connected with the print controller 226 for setting print conditions in and instructing operations to the film image projector 22, and a monitor 228 as a notifying means for displaying the set conditions and information concerning the judgment. The magnetic data read by the reading unit 227 are used to set the conditions for printing the images on the photographic paper.

The printer 24 is provided with magazines which are set in an upper portion and in each of which a roll of photographic paper is contained. A feeding means 242 is provided for conveying the photographic paper dispensed from the magazine 241. A cutter 243 is also provided for cutting the photographic paper dispensed from the magazine 241 to specified lengths and a printing section 244 is used for printing the image projected by the film image projector 22 on the surface of the cut photographic paper.

The developing assembly 30 is provided with a plurality of treatment tanks 32 filled with treatment solutions used to develop the photographic paper carrying the printed image thereon and a drying chamber 34 for drying the photographic paper discharged from the treatment tanks 32.

Figure 2A:
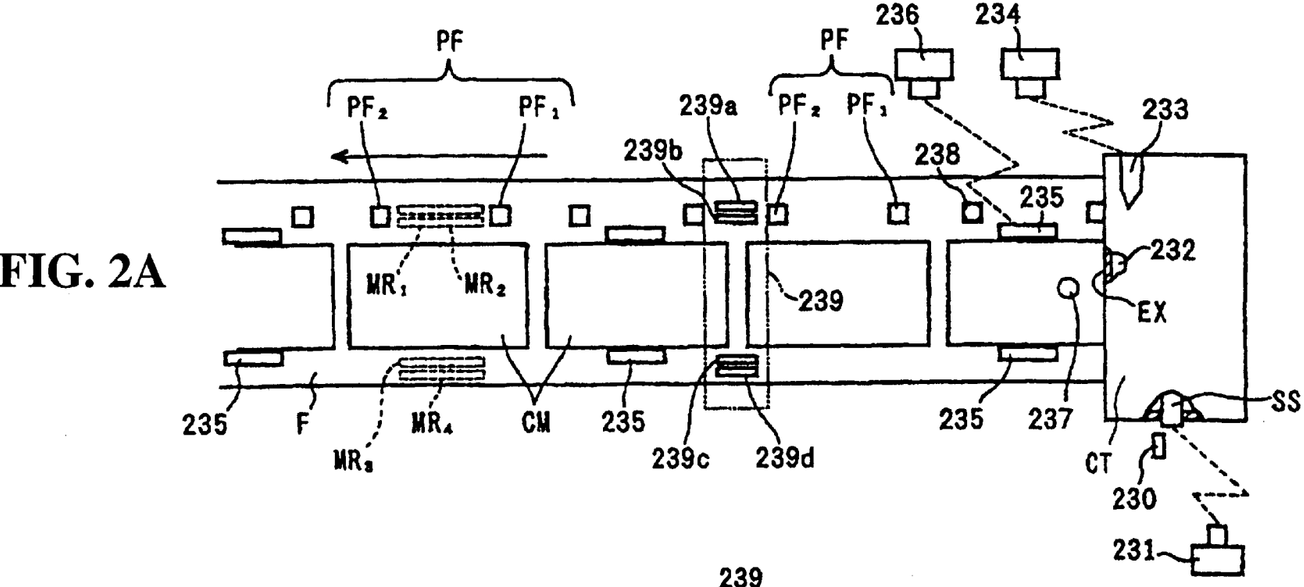
FIG. 2A is a plan view showing the construction of a reading unit provided in the photo-printing apparatus of FIG. 1.
Figure 2B:
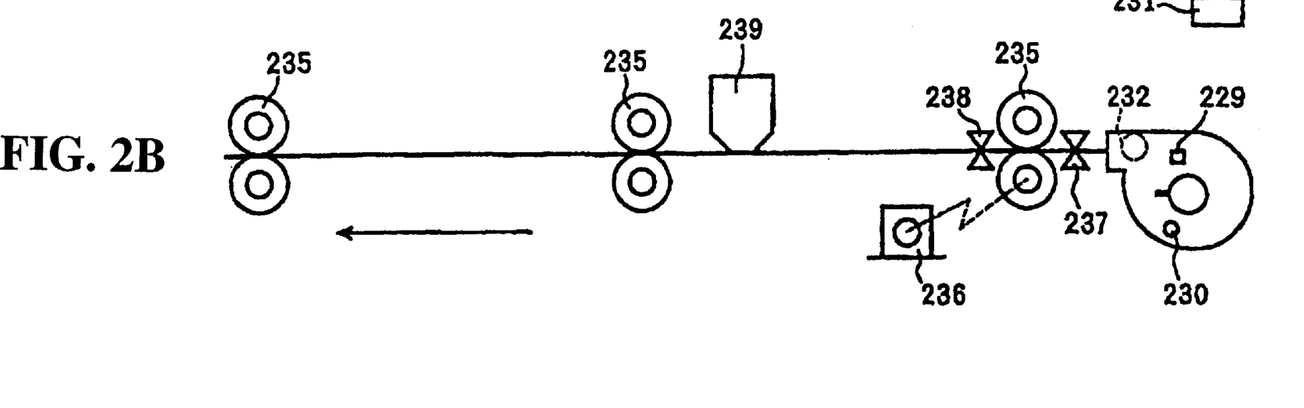
FIG. 2B is a side view showing the construction of a reading unit provided in the photo-printing apparatus of FIG. 1.

FIGS. 2A and 2B are respectively a plan view and a side view showing the internal schematic construction of the reading unit 227. Specifically, a cartridge CT containing a photographic film is placed in a specified position in the reading unit 227. Where the cartridge CT is to be set, a cartridge sensor 229 is arranged for detecting whether or not the cartridge CT is set and a film sensor 230 is provided for detecting whether or not the photographic film contained in the set cartridge CT is already developed.

Inside the cartridge CT is provided a spool shaft SS around which the photographic film F is wound. This spool shaft SS is driven by a shaft pulse motor 231, thereby conveying the photographic film F to a film inlet/outlet EX of the cartridge CT. In the position of the film inlet/outlet EX of the cartridge CT is arranged a light blocking lid 232 for closing the film inlet/outlet EX to block the entrance of light. This light blocking lid 232 is opened and closed by a lid opening unit 233, which is driven by a lid pulse motor 234.

At a downstream side of the reading unit 227, with respect to a direction of conveyance of the photographic film F, are arranged a plurality of pairs of transport rollers 235 for conveying the photographic film F to the downstream side while holding it from opposite sides along the vertical direction. The lower transport roller 235 of the most upstream pair is driven by a roller pulse motor 236.

At one side end of the photographic film F with respect to its widthwise direction are formed multiple perforations (detection holes) PF for defining frames CM (exposure areas enclosed by rectangular frame lines) of the photographic film F along its longitudinal direction. Specifically, each frame CM is defined by a pair of successive perforations $PF_1$, $PF_2$ formed at a specified interval, and two strip-shaped magnetic recording portions $MR_1$, $MR_2$ (shown only for one frame in FIG. 2 in order to simplify FIG. 2) are provided in parallel between each pair of perforations $PF_1$, $PF_2$. The magnetic recording portions $MR_1$, $MR_2$ are, for example, used as areas in which a magnetic data as a print information is recorded by a recording means such as a magnetic write head of a photo-printing apparatus or another film processing apparatus other than a camera. At the other side end of the photographic film F with respect to its widthwise direction, two strip-shaped magnetic recording portions $MR_3$, $MR_4$ (shown only for one frame in FIG. 2 in order to simplify FIG. 2) are provided in parallel in positions corresponding to the magnetic recording portions $MR_1$, $MR_2$ for each frame CM. The magnetic recording portions $MR_3$, $MR_4$ are, for example, used as areas in which a magnetic data such as print information is recorded by a recording means such as a magnetic write head provided in a camera.

A film or negative leading end sensor 237 is arranged in the vicinity of the cartridge CT in a position above the widthwise center of the photographic film F dispensed from the cartridge CT in the reading unit 227. Further, a perforation sensor 238 is arranged in a position above one side end of the photographic film F.

A magnetic data reader 239 is arranged in a position above the photographic film and downstream from the perforation sensor 238. The magnetic data reader 239 is provided with a pair of magnetic read heads 239a, 239b in positions corresponding to the magnetic recording portions $MR_1$, $MR_2$ of the photographic film F and another pair of magnetic read head 239c, 239d in positions corresponding to the magnetic recording portions $MR_3$, $MR_4$. With the respective magnetic read heads 239a, 239b, 239c, 239d are connected comparators 239e, 239f, 239g, 239h, with which a RAM 239i (FIG. 3) is connected.

The magnetic read head 239a reads the magnetic data recorded in the magnetic recording portion $MR_1$, and the magnetic read head 239b reads the magnetic data recorded in the magnetic recording portion $MR_2$. Further, the magnetic read head 239c reads the magnetic data recorded in the magnetic recording portion $MR_3$, and the magnetic read head 239d reads the magnetic data recorded in the magnetic recording portion $MR_4$. The comparators 239e, 239f, 239g, 239h convert the magnetic data read by the respective magnetic read heads 239a, 239b, 239c, 239d into binary data. The RAM 239i stores the thus converted binary data of the magnetic data recorded in the magnetic recording portions $MR_1$, $MR_2$, $MR_3$, $MR_4$ of each frame CM.

Figure 3:
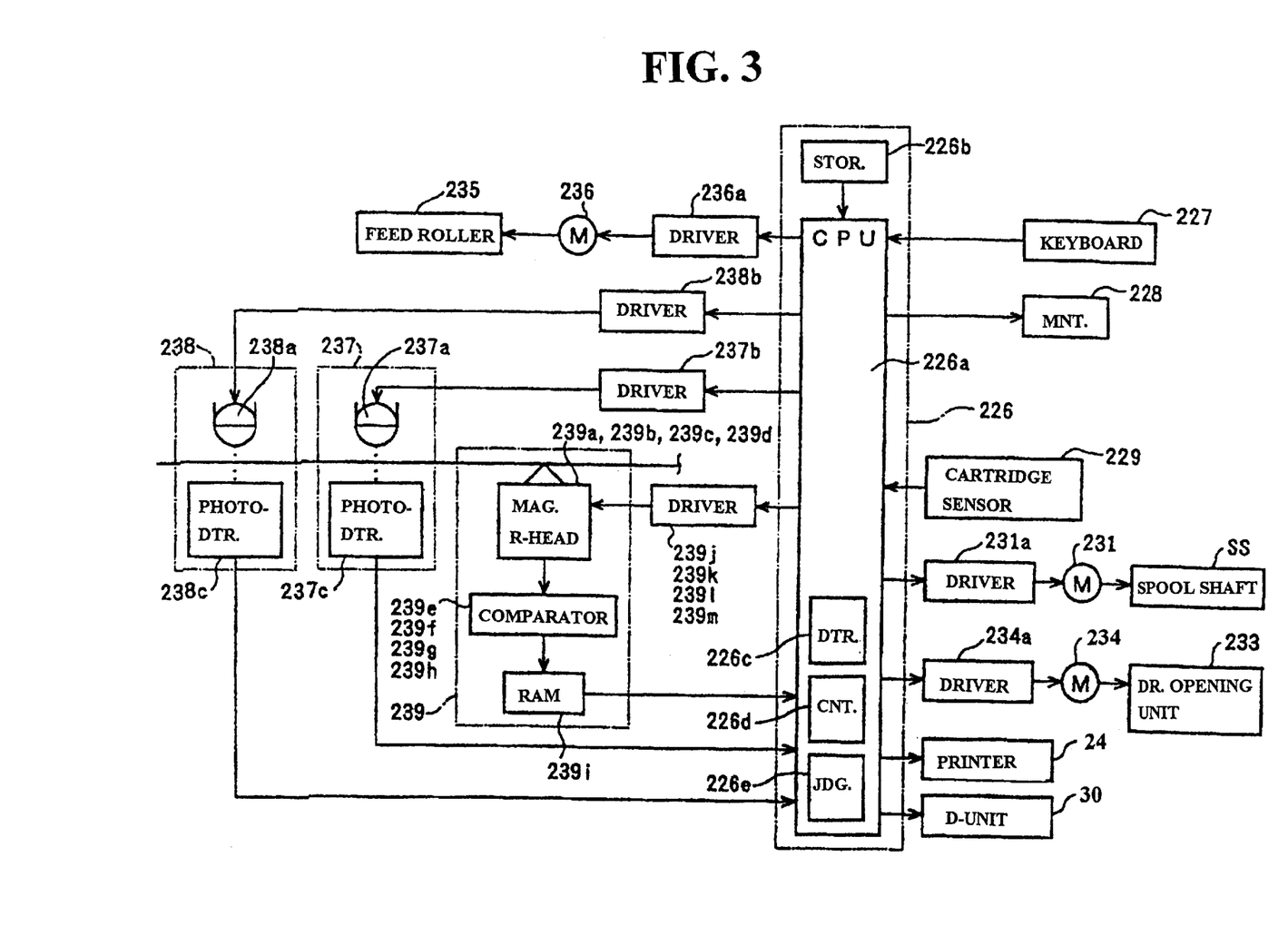
FIG. 3 is a diagram showing the construction of a control system of the photo-printing apparatus of FIG. 1.

FIG. 3 is a diagram showing the schematic construction of a control system of the photo-printing apparatus 10. In FIG. 3, the print controller 226 is provided with a CPU 226a for implementing specified operations and a storage 226b including a ROM for storing specified programs and a RAM for temporarily storing data.

With the print controller 226 are connected the cartridge sensor 229, a driver 231a for the shaft pulse motor 231 for driving the spool shaft SS, a driver 234a for the lid pulse motor 234 for driving the lid opening unit 233, a driver 237b for driving a light emitting section (LED) 237a of the negative leading end sensor 237, a photodetector 237c of the negative leading end sensor 237, a driver 238b for driving a light emitting section (LED) 238a of the perforation sensor 238, a photodetector 238c of the perforation sensor 238, drivers 239j, 239k, 239l, 239m for driving the magnetic read heads 239a, 239b, 239c, 239d of the magnetic data reader 239, the RAM 239i of the magnetic data reader 239 and a driver 236a for the roller pulse motor 236 for driving the transport roller 235. The printer 24 and the developing assembly 30 are also connected with the print controller 226.

The CPU 226a is provided with the respective functions of a detector means 226c for detecting a change in the read state while the magnetic recording portions $MR_3$, $MR_4$ are scanned by the magnetic read heads 239c, 239d of the magnetic data reader 239, a counter means 226d for counting the number of the changes in the read state detected by the detector means 226c and a judging means 226e for comparing a count value of the counter means 226d with a judgment reference value to judge whether or not a magnetic data read error has occurred.

Figure 4:
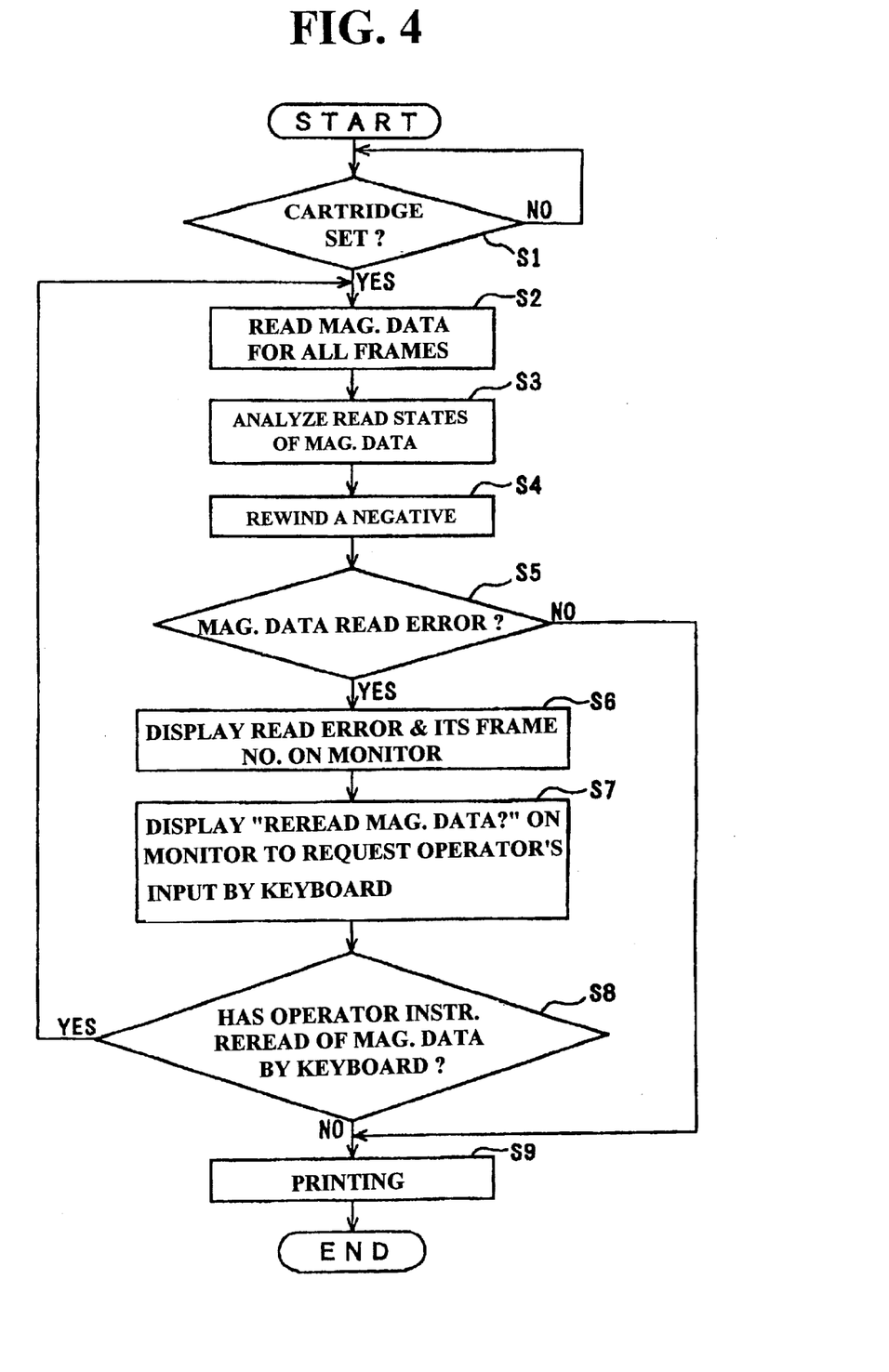
FIG. 4 is a flow chart showing an entire operation of the photo-printing apparatus of FIG. 1.

Next, the overall operation of the photo-printing apparatus 10 is described with reference to a flow chart of FIG. 4. First, whether or not the cartridge CT containing the roll of photographic film F is set in the specified position is detected (Step S1). When the cartridge CT is set (YES in Step S1), the light blocking lid 232 of the cartridge CT is opened and the photographic film F is dispensed to the outside through the film inlet/outlet EX of the cartridge CT by driving the shaft pulse motor 231. This dispensing operation is stopped when the leading end of the photographic film F reaches the position of the perforation sensor 238 after passing the negative leading end sensor 237. The film sensor 230 may detect, after Step S1, whether or not the photographic film F contained in the cartridge CT set in the specified position is already developed and the photographic film F may be dispensed through the film inlet/outlet EX only in the case of the developed film.

Thereafter, the photographic film F is conveyed to the downstream side by the transport roller 235. At this time, the perforation sensor 238 successively detects the perforations PF to identify the respective frames. Since an amount of rotation of the roller pulse motor 236 for driving the transport roller 235 corresponds to an amount of movement of the photographic film F, the respective frames are identified also by the amount of rotation of the roller pulse motor 236.

When the photographic film is intermittently conveyed frame by frame to the downstream side, the magnetic data recorded in the respective magnetic recording portions $MR_1$, $MR_2$, $MR_3$, $MR_4$ in positions corresponding to the respective frames CM by the magnetic read heads 239a, 239b, 239c, 239d of the magnetic data reader 239, and the magnetic data of all frames CM converted into the binary data by the comparators 239e, 239f, 239g, 239h are stored in the RAM 239i (Step S2). Thereafter, the read state of the magnetic data of each frame CM is analyzed (Step S3), and then the photographic film F is rewound (Step S4). The analyzing operation of the read state of the magnetic data in Step S3 is described later.

Subsequently, whether or not a magnetic data read error has occurred is judged based on the analysis of the read state of the magnetic data in Step S3 (Step S5). If the magnetic data read error is judged to have occurred (YES in Step S5), an occurrence of the read error and the identifying number of the frame CM where the read error has occurred are displayed as information concerning the judgment on the monitor 228 to notify the operator of the occurrence of the read error (Step S6). Then, a question as to whether or not the magnetic data is to be reread is displayed on the monitor 228, thereby requesting the operator to input an instruction by means of the keyboard 227 (Step S7).

When the operator instructs a next operation by operating the keyboard 227, whether or not a command to reread the magnetic data has been made is judged (Step S8). If no such command has been made (NO in Step S8), the film image is printed on the photographic paper (Step S9). Upon the completion of the printing, the cartridge CT is detached by the operator. If the magnetic data is judged to have been normally read in Step S5 (NO in Step S5), printing is immediately performed in Step S9. If the command to reread the magnetic data is judged to have been made in Step S8 (YES in Step S8), the magnetic data are reread in Step S2.

Figure 5:
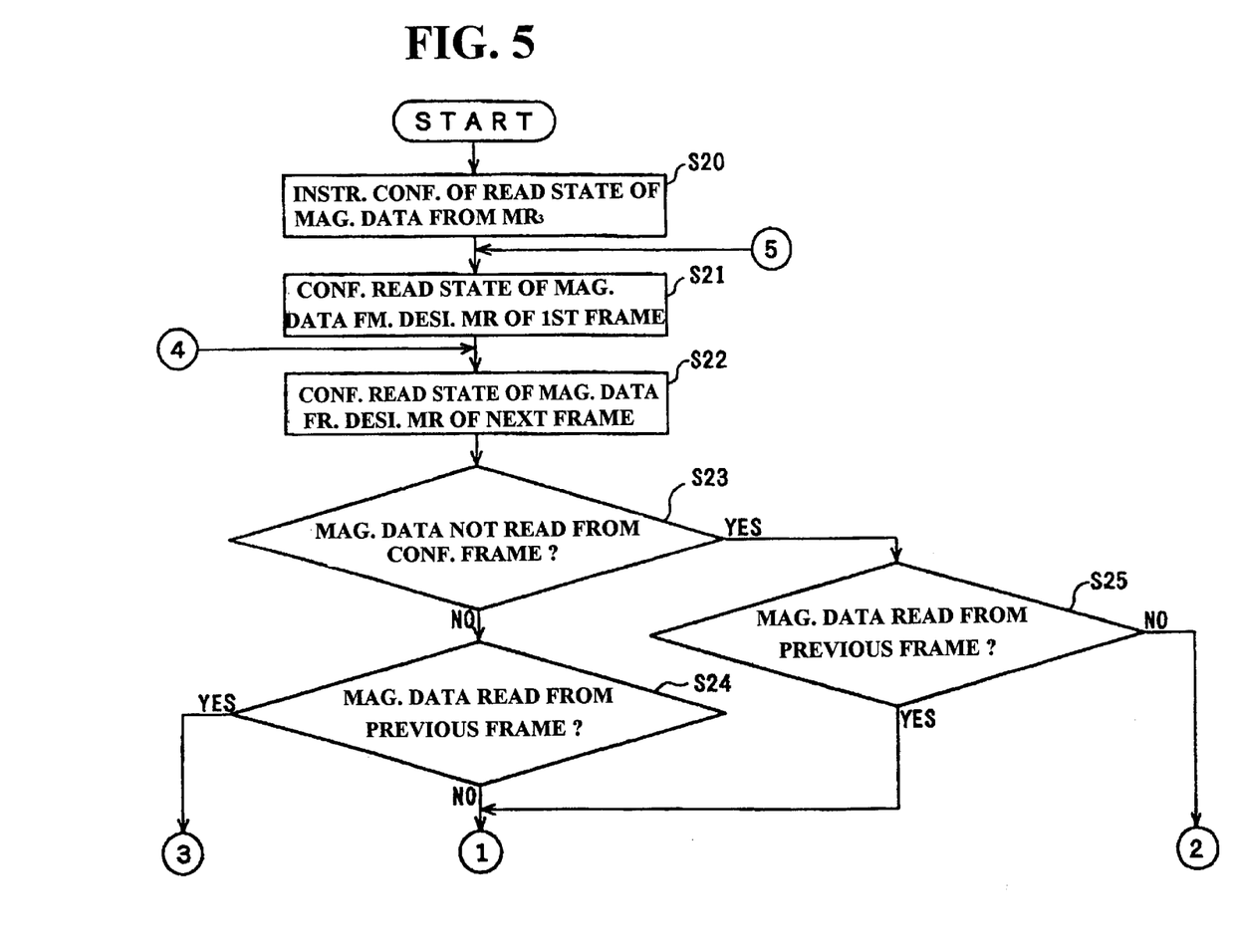
FIGS. 5 and 6 are flow charts showing an operation of judging an occurrence of an error when reading data recorded in a photographic film.
Figure 6:
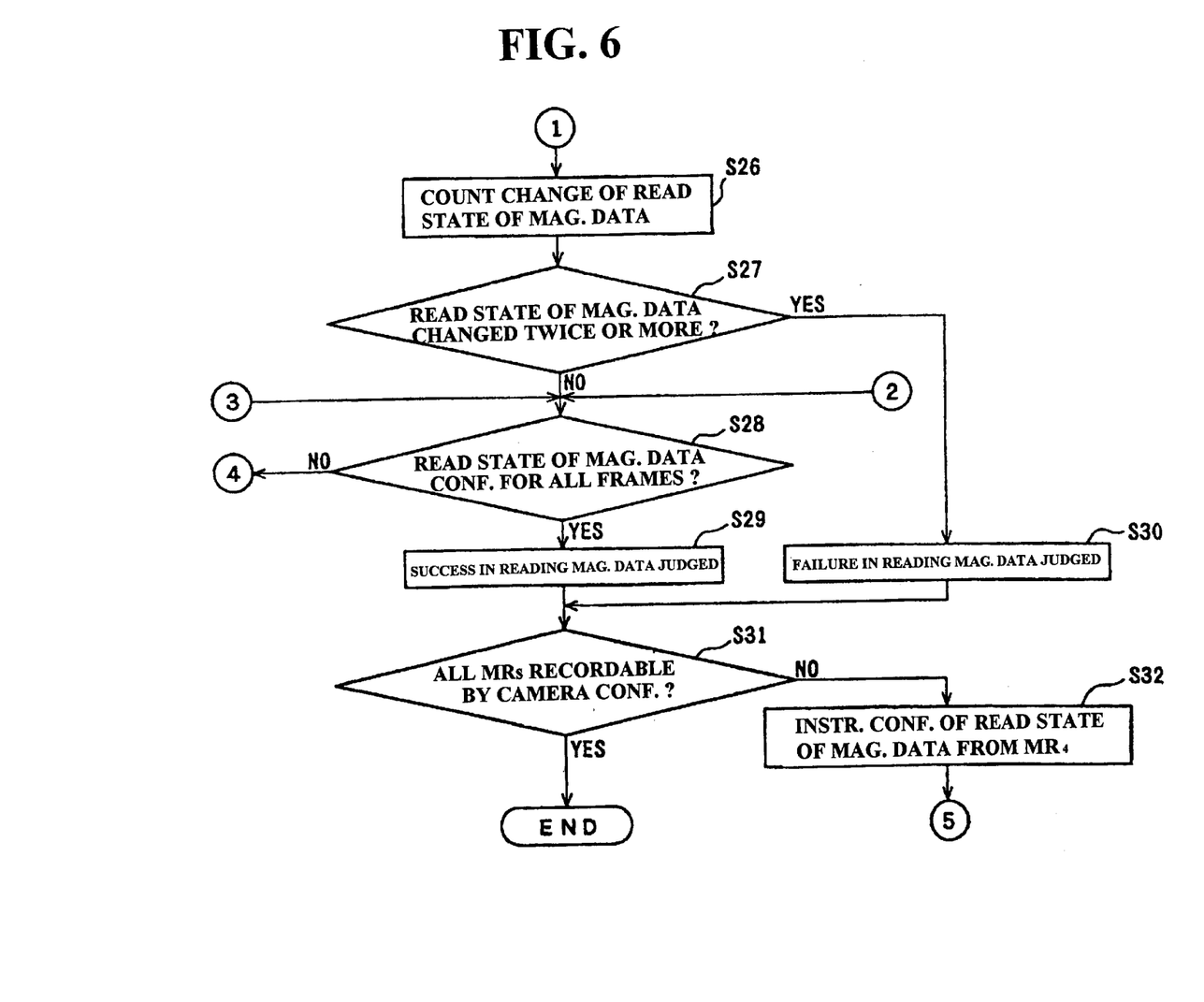

Next, the analyzing operation of the read state of the magnetic data of each frame CM in Step S3 is described with reference to a flow chart shown in FIGS. 5 and 6. In this embodiment, an error in reading the magnetic data from the magnetic recording portions $MR_3$, $MR_4$ is judged. Specifically, the read error is judged not to have occurred if the judgment result falls under any of cases ① to ④, whereas the read error is judged to have occurred if it is otherwise not listed.

Figure 7A:
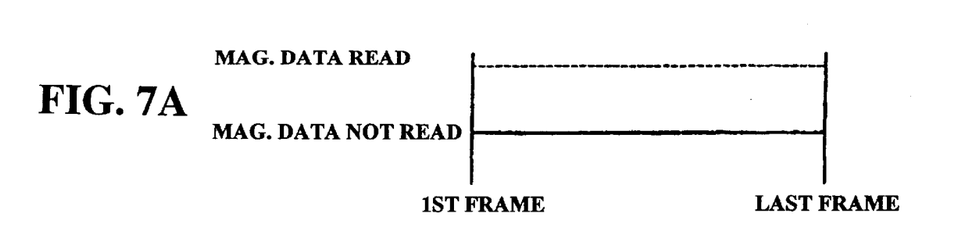
FIG. 7A shows a state where magnetic data could be read for none of the frames.

① A case where the magnetic data were read from none of the frames of the photographic film F as shown in solid line in FIG. 7A.

Figure 7B:
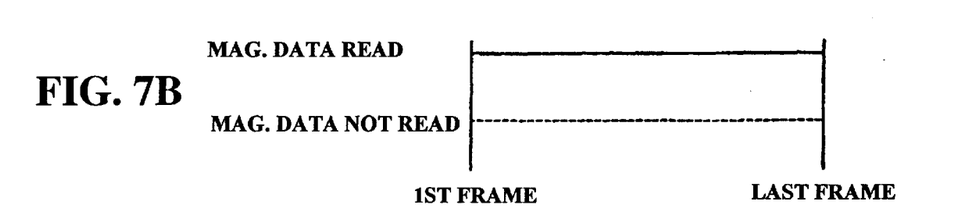
FIG. 7B shows a state where the data could be read for all frames.

② A case where the magnetic data were read from all frames of the photographic film F as shown by the solid line in FIG. 7B. In this case, it is apparent that no read error has occurred since the magnetic data were recorded in all frames.

Figure 7C:
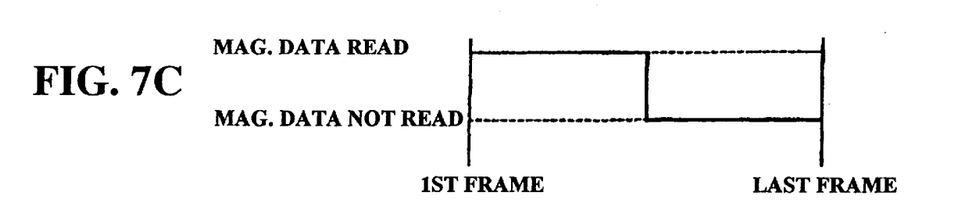
FIG. 7C shows a state where the data could be read from the first frame to an intermediate frame, but could not be read for the subsequent frames.

③ A case where the magnetic data were read from the first frame to an intermediate frame of the photographic film, but were not read from any of the subsequent frames as shown in solid line in FIG. 7C. In this case, it can be judged that the photographic film F was exposed up to the intermediate frame and that no exposure was made to the subsequent frames.

Figure 7D:
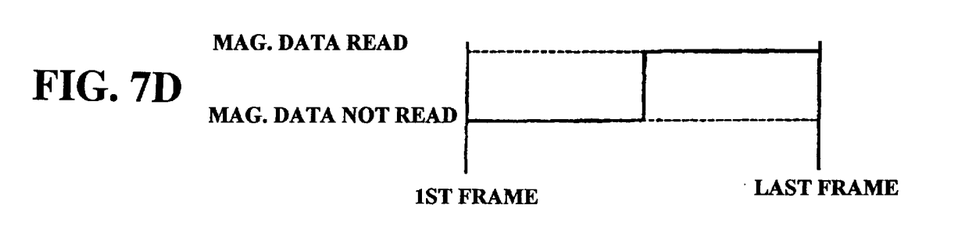
FIG. 7D shows a state where the data could not be read from the first frame to the intermediate frame, but could be read for the subsequent frames.

④ A case where the magnetic data were not read from the first frame to an intermediate frame, but were read from all of the subsequent frames as shown in solid line in FIG. 7D. In this case, it can be judged that exposure was made to the photographic film F not from the first frame, but from an intermediate frame.

As is clear from FIGS. 7A to 7D, the read error is judged not to have occurred if the read state has changed, i.e. the read state of the magnetic data changed from on (i.e. read) to off (i.e. not read) or from off to on between successive frames, not at all (FIG. 7A or 7B) or once (FIG. 7C or 7D) when all frames were scanned.

Figure 8A:
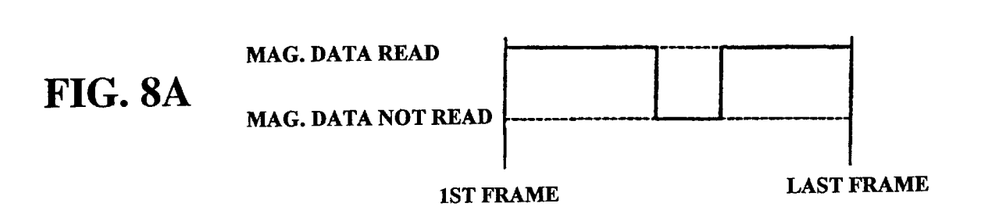
FIG. 8A shows a state where the magnetic data could be read from a group of first frames, could not be read from a group of intermediate frames, and could be read again from a group of last frames.

On the other hand, the read state has changed twice in the case that the magnetic data could be read from a group of first frames, could not be read from a group of intermediate frames, and could be read again from a group of last frames as shown the solid line in FIG. 8A. Likewise, the read state has changed twice in the case that the magnetic data could not be read from a group of first frames, could be read from a group of intermediate frames, and could not be read again from a group of last frames as shown in solid line in FIG. 8B.

Figure 8B:
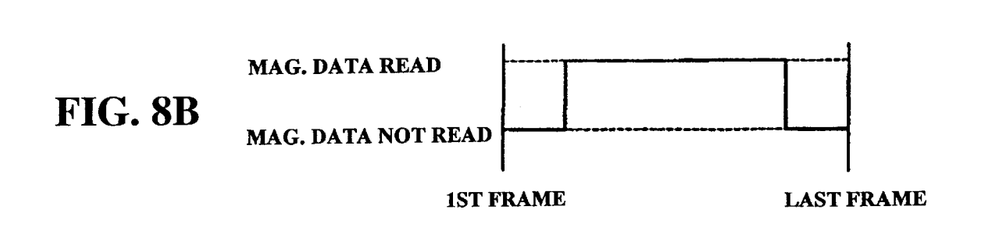
FIG. 8B shows a state where the magnetic data could not be read from a group of first frames, could be read from a group of intermediate frames, and could not be read again from a group of last frames.

The state as shown in FIG. 8A or 8B may occur in the case that no exposure was made to the frames of an intermediate portion of the photographic film F, but exposure was made to the frames of portions before and after the intermediate portion or in the case that exposure was made to the frames of an intermediate portion, but no exposure was made to the frames of portions before and after the intermediate portion. A probability of having such a state is supposed to be normally very low. Further, a probability of having a state where the read state has changed three times or more between successive frames is supposed to be even lower. Thus, there is no problem in judging that the read error has occurred if the read state has changed twice or more between successive frames.

Referring back to FIGS. 5 and 6, an instruction is given to first confirm the read state of the magnetic data from the magnetic recording portion $MR_3$ among those read from the magnetic recording portions $MR_1$, $MR_2$, $MR_3$, $MR_4$ which are stored in the RAM 239i of the magnetic data reader 239 (Step S20). The magnetic data of the leading frame read from the magnetic recording portion $MR_3$ is read from the RAM 239i to confirm the read state of this data (Step S21), and then the magnetic data of the next frame is read to confirm the read state of the data (Step S22).

Whether or not the magnetic data of the frame confirmed in Step S22 has been read is judged (Step S23). If the magnetic data has been read (NO in Step S23), whether or not the magnetic data of the one previous frame has been read is judged (Step S24). Whether or not the magnetic data of the one previous frame has been read is judged (Step S25) also if the judgment result in Step S23 is in the affirmative, i.e. "YES". The read state has changed between successive frames both when the magnetic data of the one previous frame has not been read (NO in Step S24) or when the magnetic data of the one previous frame has been read (YES in Step S25). This change is detected by the detector means 226c and is counted by the counter means 226d (Step S26).

Subsequently, whether the read state has changed twice or more (i.e. the counter value is 2 or more) is judged (Step S27). Unless the read state has changed twice or more (NO in Step S27), whether or not the read state of the magnetic data has been confirmed for all frames is judged (Step S28). Unless the read state has been confirmed for all frames (NO in Step S28), Steps S22 and subsequent Steps are repeated. In other words, whether or not the read state has changed between the successive frames such as between the second and third frames and between the third frame and the fourth frame, . . . , is judged. If the read state has changed, this change is added to the count value. Step S28 follows also when the judgment result in Step S24 is in the affirmative and when the judgment result in Step S28 is in the negative.

The magnetic data read error is judged not to have occurred (Step S29) if the judgment result in Step S28 is in the affirmative, whereas it is judged to have occurred (Step S30) if the judgment result in Step S27 is in the affirmative. Subsequently, whether or not the read states of both the magnetic recording portions $MR_3$, $MR_4$ in which data are recordable by the recording means of the camera have been confirmed is judged (Step S31). If the confirmation of the read states of the magnetic recording portions $MR_4$ has not yet been completed (NO in Step S31), Step S21 and subsequent Steps are repeated after a command to confirm the read states of the magnetic data from the magnetic recording portions $MR_4$ is given (Step S32). The analyzing operation of the read states of the magnetic data is completed when the confirmation of the read states of the magnetic data from both the magnetic recording portions $MR_3$, $MR_4$ are completed (YES in Step S31).

The inventive method and apparatus for judging an occurrence of an error when reading the data recorded in the photographic film are such that a change in the read state is detected when the read state of the data has changed from on to off or from off to on between the successive frames and the number of the detected changes is counted. The count value of the changes in the read state is compared with the judgment reference value to judge whether a data read error has occurred. Accordingly, the occurrence of the error when reading the magnetic data recorded in the magnetic recording portions provided in conformity with the respective frames of the photographic film can accurately be judged.

In other words, no magnetic data read error would be judged unlike the prior art even if a photographic film in which the magnetic data are recorded from the first frame only to an intermediate frame or a photographic film in which the magnetic data are recorded from an intermediate frame to the last frame. Thus, the reliability of the read error judgment can be improved. Further, operability during the printing process, etc. can be improved.

Furthermore, unlike the prior art, there is no likelihood of entertaining apprehension that the apparatus may be defective when an occurrence of the read error is judged even after rereading the magnetic data because the magnetic data are not recorded. Further, since no read error would be judged, unlike the prior art, even if the magnetic data as print information are discretely recorded in the specified magnetic recording portions, the reliability of the read error judgment can be improved.

The inventive method and apparatus for judging an occurrence of the error when reading the data recorded in the photographic film may come in a variety of modifications as follows.

(1) In the foregoing embodiment, the read error is judged to have occurred when the change in the read state of the magnetic data (count value) is one or less, while being judged to have occurred when the changes in the read state are two or more. However, the judgment reference value may be changed depending upon the photographing mode. For example, the read error may be judged to have occurred when the changes in the read state of the magnetic data (count value) are two or less, while being judged to have occurred when the changes in the read state are three or more.

(2) In the foregoing embodiment, an occurrence of the error in reading the magnetic data from the magnetic recording portions $MR_3$, $MR_4$ for storing the photographic information is judged. However, such a judgment can also be made using the magnetic data in the magnetic recording portions $MR_1$, $MR_2$ as in the case that the print information of each exposed frame is recorded in the magnetic recording portions $MR_1$, $MR_2$.

(3) Although the read states of the magnetic data are confirmed in a successive order from the first frame to the last frame in order to judge an occurrence of the magnetic data read error in the foregoing embodiment, they may be confirmed in a reverse order from the last frame to the first frame.

(4) Although the photographic film illustrated in the foregoing embodiment has a construction adopted by the advanced photosystem, the photographic film to which the read error judging method and apparatus according to the invention are applicable may have any construction provided that it has magnetic recording portions for recording the photograph information and the like in conformity with the respective frames in addition to the exposure areas.

(5) The photograph information and the print information are recorded in the magnetic recording portions in the foregoing embodiment (as well as in the above modifications). However, instead of the magnetic recording portions, recording portions in which an information is recorded in a method other than the magnetic method may also be used.

(6) Although the information concerning the judgment is displayed on the monitor 228 in the foregoing embodiment, it may be notified by a buzzer, a lamp or other means.

(7) Although the judging apparatus implementing the read error judging method according to the invention is applied to the photo-printing apparatus in the foregoing embodiment, it is also applicable to other photographic film processing apparatuses. In the case of application to the photo-printing apparatus, the photo-printing apparatus may be integrally provided with a developing assembly for the photographic film or may print a film image on a photographic paper after converting it into a digital image.

As described above, the inventive method for judging an occurrence of an error when reading the data recorded in the photographic film comprises the steps of: detecting whether or not the read state has changed between successive frames; counting the changes in the read state; and judging an occurrence of the data read error by comparing the count value of the changes in the read state with the judgment reference value. Accordingly, the occurrence of the error when reading the data recorded in the recording portions provided in conformity with the respective frames of the photographic film can accurately be judged.

Further, the inventive apparatus for judging an occurrence of error when reading the data recorded in the photographic film comprises the reading means for reading the data recorded in the recording portions frame by frame, the detector means for detecting whether or not the read state has changed between the successive frames, the counter means for counting the number of changes in the read state, and the judging means for judging whether or not the data read error has occurred by comparing the count value obtained by the counter means with the judgment reference value. Accordingly, the apparatus capable of accurately judging the occurrence of the error when reading the data recorded in the recording portions provided in conformity with the respective frames of the photographic film can be realized.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. A method for judging an occurrence of an error when reading data recorded in recording portions provided in conformity with respective frames of a photographic film, comprising the steps of:

reading data from all of the recording portions associated with all of the respective frames of the photographic film;

following said step of reading data from all of the recording portions, detecting whether or not a read state has changed from on to off or from off to on between successive frames;

counting a number of changes in the read states; and judging an occurrence of an error reading the data by comparing a count value of the number of changes in the read states with a judgment reference value.

2. A method as defined in claim 1, wherein said step of judging includes determining that an error has not occurred when the count value is one or less.

3. A method as defined in claim 1, wherein said step of judging includes determining that an error has occurred when the count value is two or larger.

4. A method as defined in claim 2, wherein said step of judging includes determining that an error has occurred when the count value is two or larger.

5. A method as defined in claim 1, further comprising the steps of:

providing a first recording portion for receiving data recorded by a recording means provided in a camera;

providing a second recording portion for receiving data recorded by another recording means provided outside the camera; and wherein said step of judging includes determining whether an error has occurred when reading data from the first recording portion.

6. A method as defined in claim 2, further comprising the steps of:

providing a first recording portion for receiving data recorded by a recording means provided in a camera;

providing a second recording portion for receiving data recorded by another recording means provided outside the camera; and wherein said step of judging includes determining whether an error has occurred when reading data from the first recording portion.

7. A method as defined in claim 3, further comprising the steps of:

providing a first recording portion for receiving data recorded by a recording means provided in a camera;

providing a second recording portion for receiving data recorded by another recording means provided outside the camera; and wherein said step of judging includes determining whether an error has occurred when reading data from the first recording portion.

8. A method as defined in claim 1, further comprising the step of displaying at least one of the frames where the error has been judged to occur according of said step of judging.

9. An apparatus for judging an occurrence of an error in reading data recorded in recording portions provided in conformity with respective frames of a photographic film, comprising:

a reading means for reading data recorded in all of the recording portions of the respective frames of the photographic film;

a detector means for detecting whether or not a read state has changed from on to off or from off to on between successive frames, said detector means detecting changes in the read state after said reading means has read data recorded in all of the recording portions of the respective frames of the photographic film;

a counter means for counting a number of changes in the read states; and a judging means for judging an occurrence of an error reading the data by comparing the count value of the number of changes in the read states with a judgment reference value.

10. An apparatus according to claim 9, further comprising a notifying means for notifying a user of information concerning a judgment from said judging means when the read error is judged to have occurred.

11. An apparatus as claimed in claim 9, further comprising an instructing means for instructing the apparatus to reread the data when the read error is judged to have occurred.

12. An apparatus as claimed in claim 10, further comprising an instructing means for instructing the apparatus to reread the data when the read error is judged to have occurred.

13. An apparatus as defined in claim 9, further comprising means for displaying at least one of the frames where the error has been judged to occur according to said judging means.

* * * * *